3,002,008
16-ALKENYL AND 16-ALKYNYLESTRATRIENE-3,16,17-TRIOLS AND ETHERS THEREOF
David A. Tyner, Glenview, Ill., assignor to G. D. Searle & Co., Chicago, Ill., a corporation of Delaware
No Drawing. Filed Aug. 16, 1960, Ser. No. 49,815
7 Claims. (Cl. 260—397.5)

The present invention relates to compounds of the formula

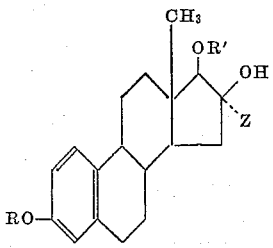

wherein R is an alkyl radical, R' is a hydrogen or alkyl radical and Z is an alkenyl or alkynyl radical. Among the alkyl radicals represented by R and R', especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl and octyl. Among the alkenyl and alkynyl radicals represented by Z, especially lower alkenyl and lower alkynyl radicals are preferred, for example, any radical derived from those recited above by replacement of single bonds by multiple bonds in the carbon atom chain.

The compounds of the present invention are prepared by a route which begins with 16-keto estradiol and its 3-(lower alkyl) ethers. The 17-hydroxy group is protected by ether formation, conveniently as a lower alkyl or pyranyl ether, and the ketone is condensed with an organo metallic derivative of a lower alkene or lower alkyne. The protecting ether group is optionally removed.

The compounds of this invention possess valuable pharmacological properties. They are highly potent agents in causing the decrease of serum cholesterol concentration and the corresponding cholesterol/phospholipid ratio; they also possess a remarkedly low estrogenic potency.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

EXAMPLE 1

*3 - methoxy - 16α - ethynyl - 1,3,5(10) - estratriene-16β,17β-diol.*—To a solution of 100 parts of 3-methoxy-1,3,5(10)-estratrien-17β-ol-16-one in 500 parts of dry benzene and 40 parts of dihydropyran is added 0.5 part of p-toluenesulfonic acid. The resultant mixture is allowed to stand for 1 hour at room temperatures, and then extracted with four 300-part portions of saturated aqueous sodium bicarbonate and two 300-part portions of brine. The organic layer is dried over anhydrous sodium sulfate and evaporated to dryness. The oily residue is taken up in 300 parts of ethanol, and the resultant solution is chilled. The precipitate which forms is removed by filtration to give 3-methoxy-1,3,5(10)-estratrien-17β-ol-16-one pyranyl ether, melting at 117–130°. To 300 parts of tertiary butyl alcohol is added 11.5 parts of potassium, and the resultant solution of potassium tertiary butoxide is saturated with acetylene. To the solution thus obtained at 5° is added a solution of 11.4 parts of 3-methoxy-1,3,5(10)-estratrien-17β-ol-16-one pyranyl ether in 50 parts of dioxane. The clear yellow solution thus obtained is stirred at 5–10° for about 5 hours in an acetylene atmosphere, and then diluted to a volume of 1 liter with ice cold water. The precipitate which forms is removed by filtration and washed with water to give the 17-pyranyl ether of 3-methoxy-16α-ethynyl-1,3,5(10)-estratriene-16β,17β-diol, melting at 152–160°. A mixture of 10 parts of the acetylenic ether, 100 parts of methanol and 0.5 part of hydrochloric acid is heated under reflux for 2 minutes and then diluted with 100 parts of hot water. On cooling to room temperature, the reaction mixture deposits a solid, which is removed by filtration and recrystallized from aqueous ethanol to give 3-methoxy-16α-ethynyl-1,3,5(10)-estratriene-16β,17β-diol melting at 190–194°.

EXAMPLE 2

*3 - ethoxy - 16α - ethynyl - 1,3,5(10) - estratriene-16β,17β-diol.*—Substitution of 105 parts of 3-ethoxy-1,3,5(10)-estratrien-17β-ol-16-one for the 3-methoxy-1,3,5(10)-estratrien-17β-ol-16-one of the preceding Example 1 gives by the procedure therein detailed 3-ethoxy-16α-ethynyl-1,3,5(10)-estratriene-16β,17β-diol.

EXAMPLE 3

*3,17β - dimethoxy - 16α - ethynyl - 1,3,5(10) - estratrien-16β-ol.*—Substitution of 11 parts of 3,17β-dimethoxy-1,3,5(10)-estratrien-16-one for the 3-methoxy-1,3,5(10)-estratrien-16-one pyranyl ether of Example 1 gives by the procedure therein detailed 3,17β-dimethoxy-16α-ethynyl-1,3,5(10)-estratrien-16β-ol, melting at about 165–169°.

EXAMPLE 4

*3,17β - diethoxy - 16α - ethynyl - 1,3,5(10) - estratrien-16β-ol.*—Substitution of 12 parts of 3,17β-diethoxy-1,3,5(10)-estratrien-16-one for the 3-methoxy-1,3,5(10)-estratrien-16-one pyranyl ether of Example 1 gives by the procedure therein detailed 3,17β-diethoxy-16α-ethynyl-1,3,5(10)-estratrien-16β-ol.

EXAMPLE 5

*3 - methoxy - 16α - (1 - octynyl) - 1,3,5(10) - estratriene-16β,17β-diol.*—To a solution of 11.3 grams of ethylmagnesium bromide in ethyl ether is added portionwise 10.4 parts of 1-octyne in 35 parts of dry ether. After the addition is completed, the solution is refluxed for 2 hours and then added portionwise to a solution of 5 parts of 3-methoxy-17β-hydroxy-1,3,5(10)-estratrien-16-one in 45 parts of benzene. The mixture is then refluxed for 6 hours. To this mixture are added 4.8 parts of acetone in 16 parts of benzene at a temperature of about 60° C. After chilling, the mixture is hydrolyzed with saturated aqueous ammonium chloride. The layers are separated, and the organic layer is evaporated. The oily residue is recrystallized twice from cyclohexane to yield 3 - methoxy - 16α - (1 - octynyl) - 1,3,5(10) - estratriene-16β,17β-diol melting at about 130–132° C.

EXAMPLE 6

*3,17β - dimethoxy - 16α - (1 - octynyl) - 1,3,5(10)-estratrien-16β-ol.*—Substitution of 5 parts of 3,17β-dimethoxy-1,3,5(10)-estratrien-16-one for the 3-methoxy-17β-hydroxy-1,3,5(10)-estratrien-16-one of Example 5 gives by the procedure therein detailed 3,17β-dimethoxy-16α-(1-octynyl)-1,3,5(10)-estratrien-16β-ol.

EXAMPLE 7

*3,17β - diethoxy - 16α - (1 - octynyl) - 1,3,5(10) - estratrien-16β-ol.*—Substitution of 5 parts of 3,17β-diethoxy-1,3,5(10)-estratrien-16-one for the 3-methoxy-17β-hydroxy-1,3,5(10)-estratrien-16-one of Example 5 gives by the procedure therein detailed 3,17β-diethoxy-16α-(1-octynyl)-1,3,5(10)-estratrien-16β-ol.

EXAMPLE 8

*3 - methoxy - 16α - vinyl - 1,3,5(10) - estratrien - 16β,17β-diol.*—A mixture of 4 parts of 3-methoxy-16α-ethynyl-1,3,5(10)-estratriene-16β,17β-diol, 200 parts of pyridene, 50 parts of dioxane and 0.1 part of 10% palladium-on-charcoal is treated with hydrogen at atmospheric pressure for 1 hour. The resultant mixture is subjected to filtration, and the filtrate is evaporated to dryness. The residue is recrystallized from methanol and then from aqueous ethanol to give 3-methoxy-16α-vinyl-1,3,5(10)-estratriene-16β,17β-diol, melting at about 99–100°.

EXAMPLE 9

*3,17β - dimethoxy - 16α - vinyl - 1,3,5(10) - estratrien-16β-ol.*—Substitution of 4 parts of 3,17β-dimethoxy-16α-ethynyl-1,3,5(10)-estratrien-16β-ol for the 3-methoxy-16α-ethynyl-1,3,5(10)-estratriene-16β,17β-diol of Example 8 gives by the procedure therein detailed 3,17β-dimethoxy-16α-vinyl-1,3,5(10)-estratrien-16β-ol.

EXAMPLE 10

*3,17β - diethoxy - 16α - vinyl - 1,3,5(10) - estratrien-16β-ol.*—Substitution of 12 parts of 3,17-diethoxy-16α-ethynyl-1,3,5(10)-estratrien-16β-ol for the 3-methoxy-16α-ethynyl-1,3,5(10)-estratriene-16β,17β-diol of Example 8 gives by the procedure therein detailed 3,17β-diethoxy-16α-vinyl-1,3,5(10)-estratrien-16β-ol.

EXAMPLE 11

*3 - methoxy - 16α - allyl - 1,3,5(10) - estratriene - 16β, 17β-diol.*—To a solution of 5 parts of 3-methoxy-17β-hydroxy-1,3,5(10)-estratrien-16-one in 22 parts of benzene there is added in the course of 3–5 minutes a solution of allyl magnesium bromide prepared from 18.4 parts of magnesium, 7.6 parts of allyl bromide and 35 parts of anhydrous ether. The resulting mixture is heated at reflux temperature for 12 hours, cooled to about 50° C. and then treated with 3 parts of acetone and 9 parts of benzene. This mixture is cooled in an ice bath while 10 parts of a saturated sodium chloride solution are added portionwise. The mixture is extracted with chloroform and the extract is dried over sodium sulfate, filtered, and taken to dryness under vacuum. The residue becomes crystalline. It is dissolved in methanol, decolorized with charcoal and treated with water to induce crystallization. Recrystallized from acetone and petroleum ether and then from cyclohexane, the 3-methoxy-16α-allyl-1,3,5(10)-estratriene-16β,17β-diol melts at about 124–130° C.

I claim:
1. A compound of the formula

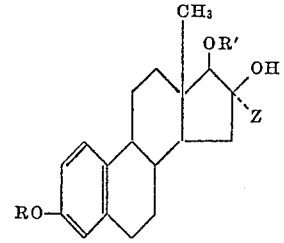

wherein R' is a member of the class consisting of hydrogen and lower alkyl, R is lower alkyl, and Z is a member of the class consisting of lower alkenyl and lower alkynyl.

2. A compound of the formula

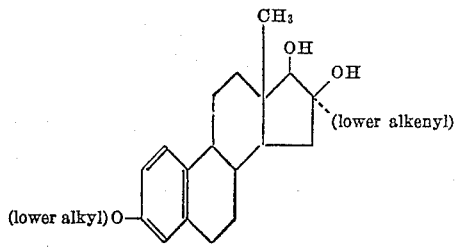

3. 3 - methoxy - 16α - vinyl - 1,3,5(10) - estratriene-16β,17β-diol.

4. 3 - methoxy - 16α-allyl - 1,3,5(10) - estratriene-16β,17β-diol.

5. 3,17β - dimethoxy - 16α - ethynyl - 1,3,5(10) - estratrien-16β-ol.

6. 3 - methoxy - 16α - ethynyl - 1,3,5(10) - estratriene-16β,17β-diol.

7. 3 - methoxy - 16α - (1 - octynyl) - 1,3,5(10) - estratriene-16β,17β-diol.

No references cited.